United States Patent
Dunjic et al.

(10) Patent No.: US 11,381,574 B2
(45) Date of Patent: *Jul. 5, 2022

(54) SYSTEMS AND METHODS FOR DATA SECURITY NOTIFICATION GENERATION

(71) Applicant: The Toronto-Dominion Bank, Toronto (CA)

(72) Inventors: Milos Dunjic, Oakville (CA); Anthony Haituyen Nguyen, Toronto (CA); David Samuel Tax, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/372,641

(22) Filed: Jul. 12, 2021

(65) Prior Publication Data

US 2021/0344683 A1    Nov. 4, 2021

Related U.S. Application Data

(63) Continuation of application No. 16/827,854, filed on Mar. 24, 2020, now Pat. No. 11,095,656.

(51) Int. Cl.
*G06F 15/173* (2006.01)
*H04L 9/40* (2022.01)
*H04L 67/306* (2022.01)

(52) U.S. Cl.
CPC ............ *H04L 63/102* (2013.01); *H04L 63/08* (2013.01); *H04L 63/20* (2013.01); *H04L 67/306* (2013.01)

(58) Field of Classification Search
CPC ....... H04L 63/102; H04L 63/08; H04L 63/20; H04L 67/306

USPC ................................................ 709/223, 224
See application file for complete search history.

(56) References Cited

U.S. PATENT DOCUMENTS

| | | | |
|---|---|---|---|
| 8,635,101 B2* | 1/2014 | Wright | G06Q 40/00 705/7.37 |
| 9,798,876 B1* | 10/2017 | Parker-Wood | G06F 21/554 |
| 10,864,444 B1* | 12/2020 | Rao | A63F 13/71 |
| 2010/0138338 A1 | 6/2010 | Hammad et al. | |
| 2011/0082824 A1* | 4/2011 | Allison | G06N 20/00 706/20 |
| 2017/0093967 A1 | 3/2017 | Grosz | |

(Continued)

FOREIGN PATENT DOCUMENTS

WO      2019157333 A1    8/2019

*Primary Examiner* — Liang Che A Wang
(74) *Attorney, Agent, or Firm* — Rowand LLP

(57) ABSTRACT

A server comprises a communications module; a processor coupled to the communications module; and a memory coupled to the processor, the memory storing processor-executable instructions which, when executed, configure the processor to receive, via the communications module and from a remote computing device, user input indicating a response to one or more prompts; generate an aspirational profile for a user based at least on the received user input; receive, via the communications module and from a monitoring application installed on the remote computing device, monitoring data; generate a behavior profile for the user based at least on the monitoring data; and when the behavior profile is misaligned with the aspirational profile, send, via the communications module and to the remote computing device, a notification indicating that the behavior profile is misaligned with the aspirational profile.

20 Claims, 10 Drawing Sheets

(56) References Cited

U.S. PATENT DOCUMENTS

| | | |
|---|---|---|
| 2017/0161564 A1 | 6/2017 | Jobling et al. |
| 2018/0032997 A1* | 2/2018 | Gordon .............. G06Q 30/0269 |
| 2018/0144588 A1 | 5/2018 | Movsisyan |
| 2018/0191593 A1* | 7/2018 | De Knijf ................. G06F 16/20 |
| 2018/0191746 A1 | 7/2018 | De Knijf et al. |
| 2019/0147529 A1* | 5/2019 | Wright ................... G06Q 40/00 |
| | | 705/35 |
| 2020/0005284 A1* | 1/2020 | Vijayan ................. G06Q 20/02 |
| 2020/0043066 A1* | 2/2020 | Obaidi ................ H04L 63/0861 |

* cited by examiner

SYSTEMS AND METHODS FOR DATA SECURITY NOTIFICATION GENERATION

CROSS-REFERENCE TO RELATED APPLICATIONS

This application is a continuation of U.S. patent application Ser. No. 16/827,854 entitled "SYSTEMS AND METHODS FOR DATA SECURITY NOTIFICATION GENERATION", filed on Mar. 24, 2020, the contents of which are incorporated herein by reference in their entirety.

TECHNICAL FIELD

The present disclosure relates to data security and, in particular, to systems and methods for data security notification generation.

BACKGROUND

Private user data may be stored in a protected data resource, such as a secure database. Typically, an access control system would be implemented to prohibit unauthorized access of user data. An access control system may, for example, perform authentication of users and access approval for protected data.

In some contexts, users may wish to grant permission to third-parties to access their data at the protected data resource. For example, a third-party application on a user's computing device may request permission to retrieve data from a database record associated with the user. The user may provide, to the access control system, an indication of consent to share the data with the third-party application. The indication of consent may specify sharing permissions such as for example the type of data to be shared. For example, a user may specify whether one or more data types are to be shared. The access control system may then allow the requesting third-party application to gain access to the protected data resource for retrieving data based on the specified one or more data types.

Configuring data sharing configuration options may be difficult and/or time consuming for the user and as such the user may accept default data sharing configuration options requested by the third-party application itself. In many cases, the third-party application may ask for too much data (e.g. more than is needed to provide the functionality desired by the user). The user may not recognize that the default data sharing configuration options for the third-party application may be risky and may ask for more data than the user is comfortable with.

The user also may not recognize that they are engaged in behavior that is outside their comfort zone. For example, the user may install numerous third-party applications on their computing device. Each application may pose a reasonable level of risk but cumulatively, the applications may cause a level of risk that is outside of the user's comfort level.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
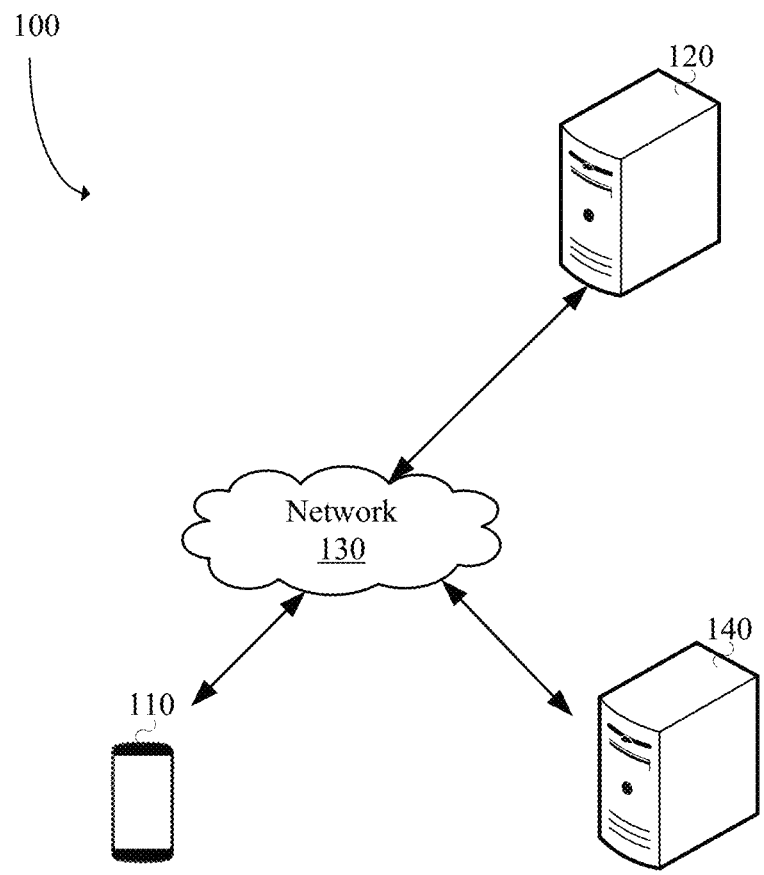
FIG. 1 is a schematic operation diagram illustrating an operating environment of an example embodiment.

Accordingly, in one aspect there is provided a server comprising a communications module; a processor coupled to the communications module; and a memory coupled to the processor, the memory storing processor-executable instructions which, when executed, configure the processor to receive, via the communications module and from a remote computing device, user input indicating a response to one or more prompts; generate an aspirational profile for a user based at least on the received user input; receive, via the communications module and from a monitoring application installed on the remote computing device, monitoring data; generate a behavior profile for the user based at least on the monitoring data; and when the behavior profile is misaligned with the aspirational profile, send, via the communications module and to the remote computing device, a notification indicating that the behavior profile is misaligned with the aspirational profile.

In one or more embodiments, the processor-executable instructions, when executed, further configure the processor to after sending the notification, receive, via the communications module and from the monitoring application installed on the remote computing device, additional monitoring data; update the behavior profile for the user based at least on the additional monitoring data; and when the behavior profile remains misaligned with the aspirational profile, modify the aspirational profile to relax the aspirational profile.

In one or more embodiments, the aspirational profile defines a level of acceptable risk for the user.

In one or more embodiments, the monitoring data includes at least one of a list of applications installed on the remote computing device and levels of permission granted to the installed applications.

In one or more embodiments, generating the behavior profile comprises obtaining a score for at least a plurality of applications in the list of applications and generating the behavior profile from the scores.

In one or more embodiments, generating the behavior profile comprises obtaining a score for at least a plurality of the levels of permission and generating the behavior profile from the scores.

In one or more embodiments, the monitoring data includes data indicating behavior conducted by the user on the remote computing device.

In one or more embodiments, the behavior conducted by the user on the remote computing device includes sharing at least one of personal data, image data and video data.

In one or more embodiments, when the behavior profile contradicts the aspirational profile, the behavior profile is determined to be misaligned with the aspirational profile.

In one or more embodiments, the processor-executable instructions, when executed, further configure the processor to send, via the communications module and to the remote computing device, one or more prompts requesting the user to respond thereto via user input.

According to another aspect, there is provided a method comprising receiving, via a communications module and from a remote computing device, user input indicating a response to one or more prompts; generating an aspirational profile for a user based at least on the received user input; receiving, via the communications module and from a monitoring application installed on the remote computing device, monitoring data; generating a behavior profile for the user based at least on the monitoring data; and when the behavior profile is misaligned with the aspirational profile, sending, via the communications module and to the remote computing device, a notification indicating that the behavior profile is misaligned with the aspirational profile.

In one or more embodiments, the method comprises after sending the notification, receiving, via the communications module and from the monitoring application installed on the remote computing device, additional monitoring data; updating the behavior profile for the user based at least on the additional monitoring data; and when the behavior profile remains misaligned with the aspirational profile, modifying the aspirational profile to relax the aspirational profile.

In one or more embodiments, the aspirational profile defines a level of acceptable risk for the user.

In one or more embodiments, the monitoring data includes at least one of a list of applications installed on the remote computing device and levels of permission granted to the installed applications.

In one or more embodiments, generating the behavior profile comprises obtaining a score for at least a plurality of applications in the list of applications and generating the behavior profile from the scores.

In one or more embodiments, generating the behavior profile comprises obtaining a score for at least a plurality of the levels of permission and generating the behavior profile from the scores.

In one or more embodiments, the monitoring data includes data indicating behavior conducted by the user on the remote computing device.

In one or more embodiments, the behavior conducted by the user on the remote computing device includes sharing at least one of personal data, image data and video data.

In one or more embodiments, when the behavior profile contradicts the aspirational profile, the behavior profile is determined to be misaligned with the aspirational profile.

According to another aspect there is provided a non-transitory computer-readable storage medium storing instructions that when executed by a processor of a computing system cause the computing system to receive, via a communications module and from a remote computing device, user input indicating a response to one or more prompts; generate an aspirational profile for a user based at least on the received user input; receive, via the communications module and from a monitoring application installed on the remote computing device, monitoring data; generate a behavior profile for the user based at least on the monitoring data; and when the behavior profile is misaligned with the aspirational profile, send, via the communications module and to the remote computing device, a notification indicating that the behavior profile is misaligned with the aspirational profile.

According to another aspect there is provided a server comprising a communications module; a processor coupled to the communications module; and a memory coupled to the processor, the memory storing processor-executable instructions which, when executed, configure the processor to receive, via the communications module and from a monitoring application installed on the remote computing device, monitoring data; generate a behavior profile for the user based at least on the monitoring data; and when the behavior profile is misaligned with the aspirational profile, update one or more configuration settings of applications installed on the remote computing device to align the behavior profile with the aspirational profile.

According to another aspect there is provided a method comprising receiving, via a communications module and from a monitoring application installed on a remote computing device, monitoring data; generating a behavior profile for a user based at least on the monitoring data; and when the behavior profile is misaligned with the aspirational profile, updating one or more configuration settings of applications installed on the remote computing device to align the behavior profile with the aspirational profile.

According to another aspect there is provided a non-transitory computer-readable storage medium storing instructions that when executed by a processor of a computing system cause the computing system to receive, via a communications module and from a monitoring application installed on a remote computing device, monitoring data; generate a behavior profile for a user based at least on the monitoring data; and when the behavior profile is misaligned with the aspirational profile, update one or more configuration settings of applications installed on the remote computing device to align the behavior profile with the aspirational profile.

According to another aspect there is provided a server comprising a communications module; a processor coupled to the communications module; and a memory coupled to the processor, the memory storing processor-executable instructions which, when executed, configure the processor to identify a group of applications installed on the remote computing device; receive, via the communications module and from a monitoring application installed on the remote computing device, monitoring data for the group of applications; generate a behavior profile for the user based on the monitoring data; and when the behavior profile is misaligned with the aspirational profile, update one or more configuration settings of applications within the group to align the behavior profile with the aspirational profile.

According to another aspect there is provided a method comprising identifying a group of applications installed on a remote computing device; receiving, via a communications module and from a monitoring application installed on the remote computing device, monitoring data for the group of applications; generate a behavior profile for a user based on the monitoring data; and when the behavior profile is misaligned with the aspirational profile, update one or more configuration settings of applications within the group to align the behavior profile with the aspirational profile.

According to another aspect there is provided a non-transitory computer-readable storage medium storing instructions that when executed by a processor of a computing system cause the computing system to identify a group of applications installed on a remote computing device; receive, via the communications module and from a monitoring application installed on the remote computing device, monitoring data for the group of applications; generate a behavior profile for a user based on the monitoring data; and when the behavior profile is misaligned with the aspirational profile, update one or more configuration settings of applications within the group to align the behavior profile with the aspirational profile.

According to another aspect there is provided a server comprising a communications module; a processor coupled to the communications module; and a memory coupled to the processor, the memory storing processor-executable instructions which, when executed, configure the processor to identify a group of applications installed on the remote computing device; receive, via the communications module and from a monitoring application installed on the remote computing device, monitoring data for the group of applications; generate a behavior profile for the user based on the monitoring data; and when the behavior profile is misaligned with the aspirational profile, remove one or more applications within the group from the remote computing device to align the behavior profile with the aspirational profile.

According to another aspect there is provided a method comprising identifying a group of applications installed on a remote computing device; receive, via a communications module and from a monitoring application installed on the remote computing device, monitoring data for the group of applications; generate a behavior profile for a user based on the monitoring data; and when the behavior profile is misaligned with the aspirational profile, remove one or more applications within the group from the remote computing device to align the behavior profile with the aspirational profile.

According to another aspect there is provided a non-transitory computer-readable storage medium storing instructions that when executed by a processor of a computing system cause the computing system to identify a group of applications installed on a remote computing device; receive, via a communications module and from a monitoring application installed on the remote computing device, monitoring data for the group of applications; generate a behavior profile for a user based on the monitoring data; and when the behavior profile is misaligned with the aspirational profile, remove one or more applications within the group from the remote computing device to align the behavior profile with the aspirational profile.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any of the listed elements alone, any sub-combination, or all of the elements, without necessarily excluding any additional elements, and without necessarily requiring all of the elements.

Access control is an important element of database security. Various security controls may be implemented for a database to safeguard the data and any operations within the database from unauthorized access. An access control system for a database typically performs functions of authentication and access approval to ensure that only authorized users can gain access to the database. For example, a private database may store account data for a plurality of user accounts, and an access control system for the database may enforce security policies to restrict access to the user account data.

An access control system may enable users to define permissions for others to access their data. In particular, users may specify which subjects are allowed to access their data and what privileges are given to those subjects. For example, account data for user accounts in a database may be accessible to only those entities that have been assigned access rights by the users associated with the accounts. The access control system for the database may limit the scope of permitted access operations based on the permissions that are defined by the users.

In some contexts, users may wish to allow third-party applications access to their data in a protected database. For example, a user may provide consent for third-party applications on their device to gain direct access to their account data. The concept of "open banking" is an example of a secure, standardized release of private user data to third-parties. Open banking allows users to grant third-party developers access to their banking data. Banks that allow such third-party access may benefit from having a larger ecosystem of applications and services that customers can use to access a wide range of banking functions. In particular, banks would not have to assume all responsibility for applications development by themselves; instead, third-party developers that are granted access to user data can develop applications that are suited for use by the banks' customers.

Generally, delegating access of user account data to third-party applications raises concerns about the security of the data and the safety level of the applications. For example, where a third-party application requests to access highly sensitive user data or to perform database operations that result in permanent changes to the user data, a balance between security of the user data and ease of control of third-party access will be desired.

As different applications generally have different demands for and use of private user data, users that provide consent for third-party applications to access their private data may not fully appreciate the risks involved in granting such access. For example, it may be difficult for users to gauge the risks of security threats, such as data leakage and unauthorized transactions, or redundant collection of data arising from third-party access of user account data.

The present disclosure provides techniques for notification generation to address security concerns relating to third-party applications. In embodiments, systems and methods are described for comparing an aspirational profile of the user to a behavior profile of the user for notification generation. In some embodiments, an aspirational profile of the user may be generated based on the user's response to one or more prompts. Monitoring data may be received from a remote computing device of the user and a behavior profile of the user may be generated based at least on the monitoring data. When the behavior profile is misaligned with the aspirational profile, a notification may be sent to the user indicating that the behavior profile is misaligned with the aspirational profile. As an example, the notification may inform the user that they are engaged in behavior that is riskier than they have indicated they are comfortable with. If the user continues to engage in behavior riskier than the user has indicated they are comfortable with, the aspirational profile may be updated to relax the aspirational profile.

FIG. 1 is a schematic operation diagram illustrating an operating environment of an example embodiment. FIG. 1 illustrates a system 100 for data security notification generation. In this embodiment, the system 100 is for comparing an aspirational profile of the user to a behavior profile of the user for notification generation.

As shown, a computing device 110 and a server 120 communicate via a network 130. The computing device 110 may be referred to as a mobile computing device or a remote computing device and may be associated with an entity, such as a user or a client, having resources associated with the server 120.

The server 120 may be referred to as an access control server and may be configured to control access to protected data. The server 120 may maintain database records for a plurality of users. In at least some embodiments, the server 120 is a financial institution server which may maintain customer bank accounts. That is, the server 120 may maintain a database that includes various data records. A data record may, for example, reflect an amount of value stored in a particular account associated with a user. The server 120 may protect the data using bank-grade security.

While FIG. 1 illustrates a single server 120, more than one such server may be engaged and connected through the network 130. Further, the single server 120 may be connected to a data resource such as for example a computer system that includes one or more database servers, computer servers, and the like. The protected data resource may be for example an application programming interface (API) for a web-based system, operating system, database system, computer hardware, or software library.

The system 100 also includes at least one application server 140. The application server 140 may be associated with a third-party application (such as a web or mobile application) that is resident on the computing device 110 and/or an API. For example, the application server 140 may connect the computing device 110 to a back-end system associated with the third-party application. The capabilities of the application server 140 may include, among others, user management, data storage and security, transaction processing, resource pooling, push notifications, messaging, and off-line support of the third-party application. The application server 140 is connected to the computing device 110 and the server 120 via the network 130.

The computing device 110, the server 120 and the application server 140 may be in geographically disparate locations. Put differently, the computing device 110 and the server 120 and the application server 140 may be remote from one another.

The computing device 110, the server 120 and the application server 140 are computer systems. The computing device 110 may take a variety of forms including, for example, a mobile communication device such as a smartphone, a tablet computer, a wearable computer such as a head-mounted display or smartwatch, a laptop or desktop computer, or a computing device of another type. In certain embodiments, a user may operate the computing device 110 to cause the computing device 110 to perform one or more operations consistent with the disclosed embodiments.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network or the like.

In the example of FIG. 1, the server 120 may provide data processing (e.g. bill payment) and data holding (e.g. banking) functions. That is, the server 120 may be a financial institution server and bill payment processing server. The server 120 may communicate with the computing device 110 and the application server 140 via the network 130 to control third-party access of protected data. Operations associated with the server 120 will be described in greater detail below.

Figure 2:
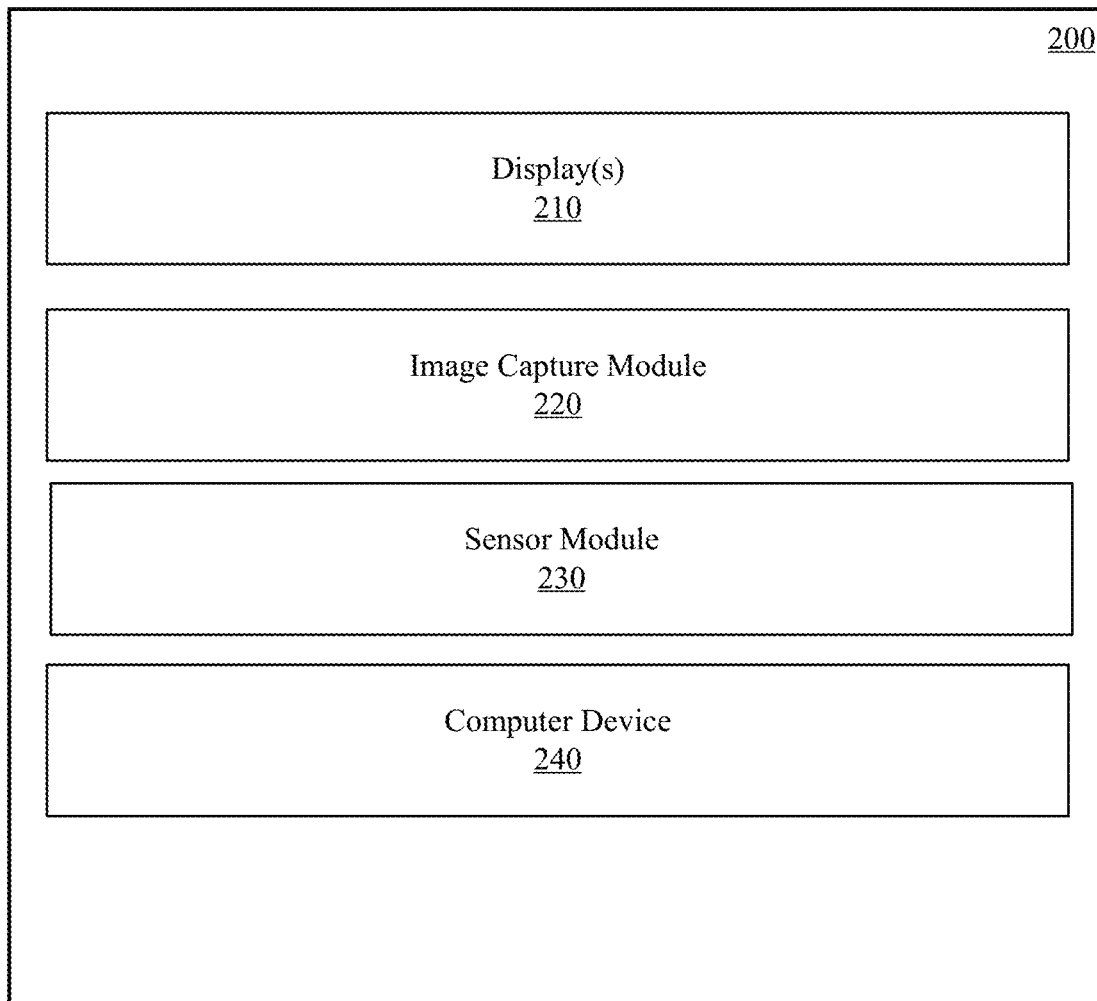
FIG. 2 is a simplified schematic diagram showing components of a computing device.

FIG. 2 is a simplified schematic diagram showing component of an exemplary computing device 200. Computing device 110 may be of the same type as computing device 200. The computing device 200 may include modules including, as illustrated, for example, one or more displays 210, an image capture module 220, a sensor module 230, and a computing device 240.

The one or more displays 210 are a display module. The one or more displays 210 are used to display screens of a graphical user interface that may be used, for example, to communicate with the server 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
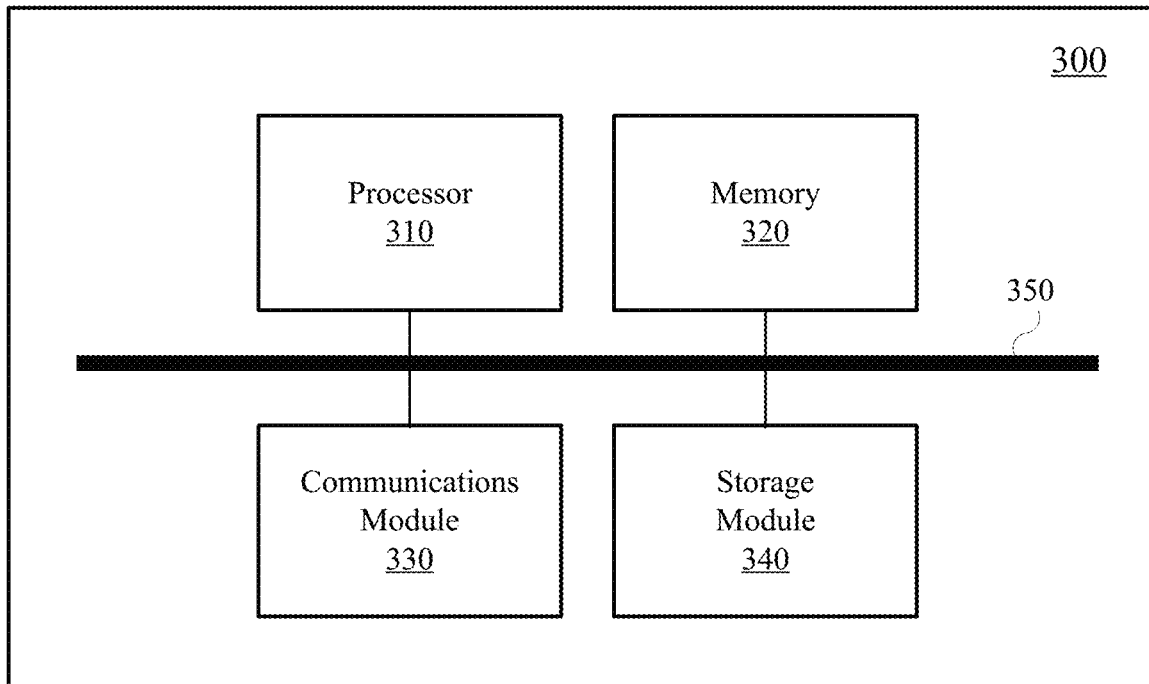
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the server 120 and/or the application server 140.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
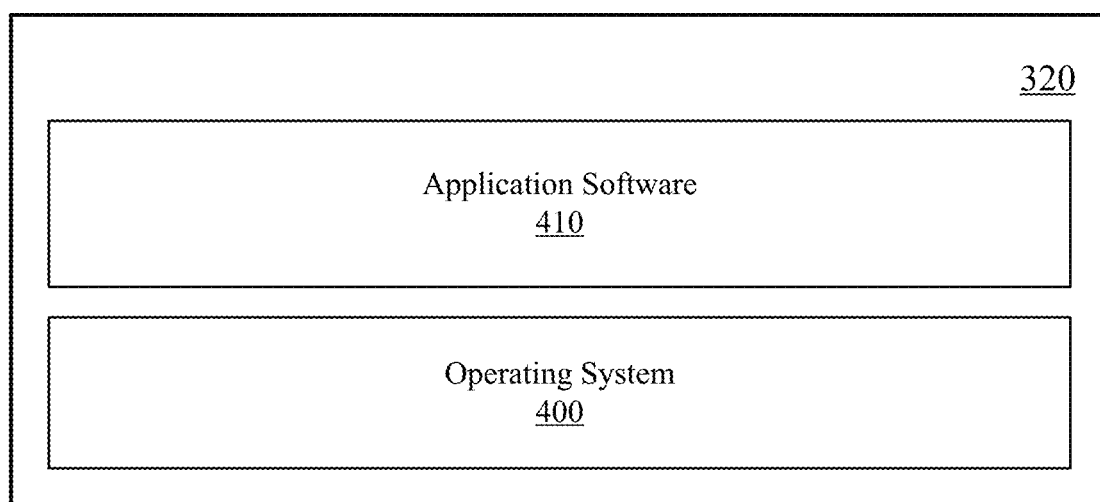
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computing device 240 (FIG. 2) of computing device 110 (FIG. 1), the server 120 (FIG. 1), and/or the application server 140.

While a single application 410 is illustrated in FIG. 3, in operation the memory 320 may include more than one application 410 and different applications 410 may perform different operations. For example, in at least some embodiments in which the computer device 300 is functioning as the computing device 110, the applications 410 may include a monitoring application for communicating monitoring data to the server 120. The monitoring data may include one or more of a list of applications installed on the computing device 110, levels of permission granted to the installed applications, internet search history data, and/or activity data indicating activity performed on the computing device 110. The activity data may, for example, indicate that the user of the computing device 110 is sending or receiving image data, is uploading image data to a particular application such as for example a social networking application, etc. The monitoring application, when installed on the computing device 110, may be configured like a Virtual Private Network (VPN) such that one or more other applications installed on the computing device 110 may send and receive data through the monitoring application. The monitoring application, when installed on the computing device 110, may be configured like an antivirus application that monitors activity on the computing device 110. The monitoring application, together with the server 120, may generate notifications that are displayed on the computing device 110.

By way of further example, in at least some embodiments the server 120, through computer-executable instructions, may be configured to receive monitoring data from the computing device 110 to generate a behavior profile for a user of the computing device 110. The server 120 may be configured, through computer-executable instructions, to compare the behavior profile to the aspirational profile.

By way of further example, in at least some embodiments the server 120, through computer-executable instructions, may be configured to send one or more prompt to the computing device 110 requesting the user to respond thereto. The one or more prompts may present one or more questions to the user. As the user responds to the one or more prompts using the computing device, data indicating the response may be received by the server 120. An aspirational profile for the user may be generated based on the received data. The aspirational profile may indicate how risky or safe the user aspires to be when it comes to sharing data such as for example image data, video data, personal data and banking data. Image data may include one or more images of the user. Video data may include one or more videos of the user. Personal data may include the user's name, address, social security number, health card information, etc. The banking data may include personal contact information, a bank balance, transaction history, credit card number, account number, etc.

By way of further example, in at least some embodiments in which the computer device 300 functions as the computing device 110, the applications 410 may include a web browser, which may also be referred to as an Internet browser. In at least some such embodiments, the server 120 may be a web server that may serve one or more of the interfaces described herein. The web server may cooperate with the web browser and may serve an interface when the interface is requested through the web browser. For example, the web server may serve as a mobile banking interface.

By way of further example, in at least some embodiments in which the computer device 300 functions as the computing device 110, the applications 410 may include an electronic messaging application. The electronic messaging application may be configured to display a received electronic message such as an email message, short messaging service (SMS) message, or a message of another type.

Embodiments of operations performed by the server 120 will now be described.

Figure 5:
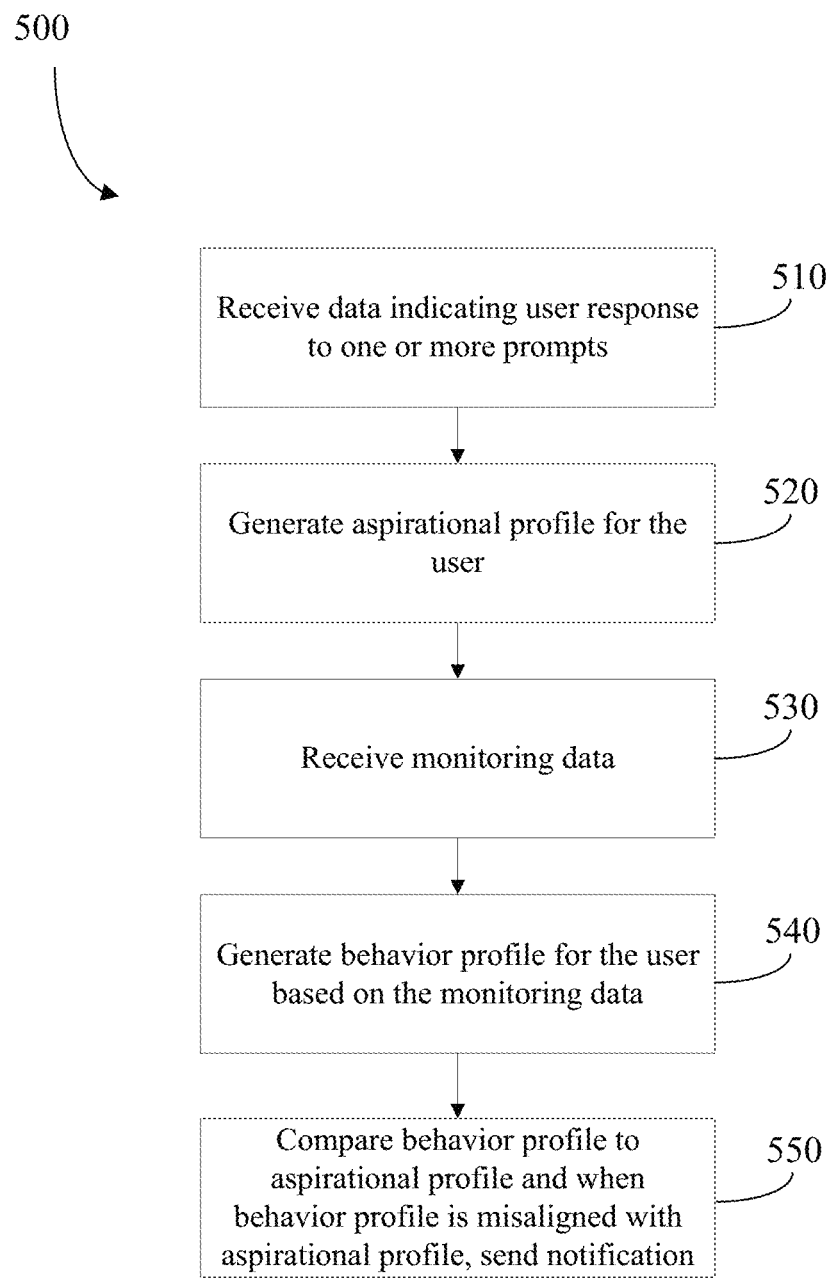
FIG. 5 is a flowchart showing operations performed by a server in comparing an aspirational profile to a behavior profile for notification generation according to an embodiment.

FIG. 5 is a flowchart showing operations performed by the server 120 according to an embodiment. The operations may be included in a method 500 which may be performed by the server 120. For example, computer-executable instructions stored in memory of the server 120 may, when executed by a processor of the server 120, configure the server 120 to perform the method 500 or a portion thereof.

The method 500 begins when the server 120 receives, via the communications module and from the computing device 110, data indicating user response to one or more prompts (step 510). In this embodiment, the one or more prompts are generated by the server 120 and are sent, via the communications module, to the computing device 110. At the computing device 110, the one or more prompts present one or more questions to the user.

Figure 6:
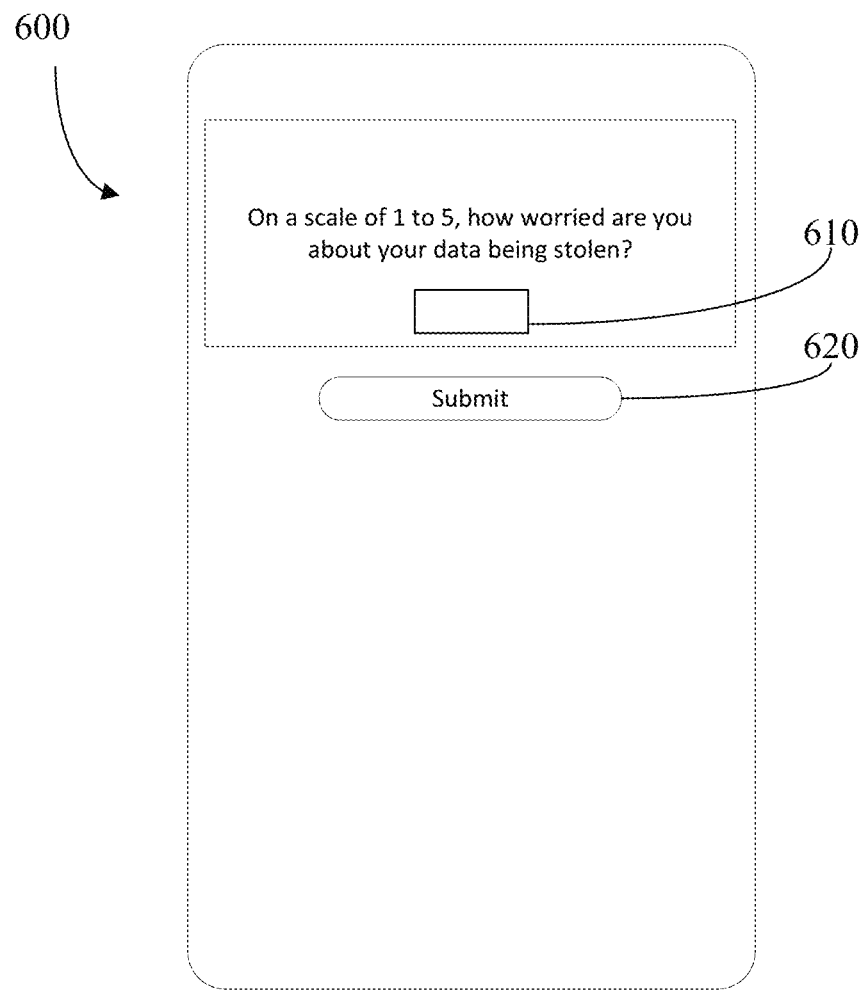
FIG. 6 shows a prompt displayed on a computing device.

An example is shown in FIG. 6. As can be seen, at the computing device 110, a prompt 600 is displayed asking the user to answer the question "On a scale of 1 to 5, how worried are you about your data being stolen?" The prompt includes an input box 610 for the user to input a number between 1 and 5 using a keyboard or keypad of the computing device 110. The prompt also includes a "submit" button 620 selectable by the user via a touch or tap gesture on the display screen of the computing device 110 to submit the response to the prompt. Once the submit button 620 is selected, data indicating response to the question is sent to the computing device 110. Another example of a question that may be presented to the user is "On a scale of 1 to 5, how worried are you about identity theft?" Another example of a question that may be presented to the user is "On a scale of 1 to 5, how comfortable are you with sharing pictures with family and friends?" Another example of a question that may be presented to the user is "On a scale of 1 to 5, how comfortable are you with sharing pictures with strangers?" It will be appreciated that each prompt may ask a question based on a particular scale such as for example a scale of 1 to 5. Each prompt may be classified based on what the scale measures. For example, in the example shown in FIG. 6, the prompt may have a scale such that a value of 1 represents the riskiest answer (the user is not worried about their data being stolen) and a value of 5 represents the safest answer (the user is worried about their data being stolen). Another prompt may have the opposite scale such that a value of 1 represents the safest answer and a value of 5 represents the riskiest answer.

The one or more prompts may additionally or alternatively present questions that require a "Yes" or "No" answer. For example, a question may be presented asking the user "Are you comfortable with sharing your address online?" The prompt may include a "Yes" and a "No" button selectable by the user via a touch or tap gesture on the computing device 110. Once the "Yes" or "No" button is selected, data indicating response to the question is sent to the computing device 110. In some examples, the "Yes" option may generate data in the form of a binary 1 and the "No" option may generate data in the form of a binary 0.

The one or more prompts may present a sequence or series of questions to the user. As the user responds, data indicating each response is sent from the computing device 110 to the server 120.

Figure 7:
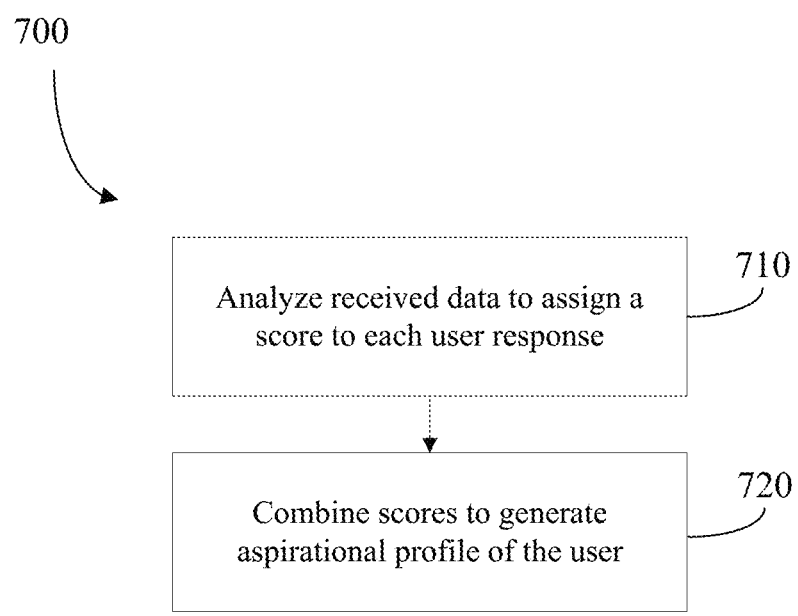
FIG. 7 is a flowchart showing operations performed by a server in generating an aspirational profile for a user.

An aspirational profile for the user is generated based on the received data (step 520). In this embodiment, the aspirational profile for the user indicates how risky the user aspires their behavior to be. FIG. 7 is a flowchart showing operations performed by the server 120 to generate the aspirational profile for the user according to an embodiment. The operations may be included in a method 700 which may be performed by the server 120. For example, computer-executable instructions stored in memory of the server 120 may, when executed by a processor of the server 120, configure the server 120 to perform the method 700 or a portion thereof.

During method 700, the received data is analyzed to assign a score to each user response (step 710). In this embodiment, the received data indicates the response provide by the user. For example, in response to the prompt shown in FIG. 6, if the user submits a "4", the received data indicates that the response is "4". The received data may also include a flag or other indicator that indicates whether a response of "1" indicates the riskiest answer or the safest answer. Put another way, the flag or other indicator is used to ensure the scale for all answers is the same.

Each user response is assigned a score based on the value entered by the user and based on whether or not the scale is set such that a response of "1" represents the riskiest or safest answer. An example is shown in Table 1:

TABLE 1

Assigning a Score to a Response

| Question | Response | Does 1 represent riskiest or safest answer? | Score |
|---|---|---|---|
| On a scale of 1 to 5, how worried are you about your data being stolen? | 4 | Riskiest (not worried) | 2 |
| On a scale of 1 to 5, how worried are you about identity theft? | 4 | Riskiest (not worried) | 2 |
| On a scale of 1 to 5, how comfortable are you with sharing pictures with strangers? | 1 | Safest (not comfortable sharing pictures with strangers) | 1 |

In Table 1, in the event that "1" represents the safest or least-risky answer, the score is equal to the value entered by the user. In the event that "1" represents the riskiest answer, the scale calculated by: 6−Response=Score. For example, a response of "1" is given a score of "5", a response of "2" is given a score of "4", a response of "3" is given a score of "3", a response of "4" is given a score of "2" and a response of "5" is given a response of "1".

Once a score has been assigned to each user response, the assigned scores are combined to generate an aspirational profile for the user (step 720). In this example, the aspirational profile for the user is generated by calculating an average score. Specifically, the score for all user responses analyzed during step 710 are summed and the result is divided by the number of responses received. For example, three (3) responses may be received and analyzed during step 710 and may be assigned scores of 2, 2 and 1. The sum of the scores is 5 and the number of responses received is 3. As such, the aspirational profile for the user is determined to be 5/3=1.7. As such, on a scale of 1 to 5, the user is assigned an aspirational profile of 1.7 indicating that the user aspires to be low risk (or safe) and as such it is assumed that the user is worried or concerned about their data or identity being stolen. It will be appreciated that in this example the minimum (or safest) aspirational profile for the user is one (1) and the maximum (or riskiest) aspirational profile for the user is five (5).

As mentioned previously, the one or more prompts may present questions that require a "Yes" or "No" answer. In this example, an answer of "Yes" may generate data in the form of a binary 1 and an answer of "No" may generate data in the form of a binary 0. The received data may also indicate whether a "Yes" indicates a risky or safe response and a score may be assigned to each user response in a manner similar to that described above. It will be appreciated that different types of prompts may be used. For example, a first prompt may present a question asking the user to input a response on a scale of "1" to "5" and a second prompt may present a question asking the user to input a response of "Yes" or "No". In this example, the score of "Yes" may be assigned a score of "1" or "5" based on whether or not it indicates a risky or safe answer. As such, different types of prompts may be combined to generate the aspirational profile for the user.

The generated aspirational profile may be stored in memory of the server 120.

Referring back to FIG. 5, the server 120 receives, via the communications module and from a monitoring application installed on the computing device 110, monitoring data (step 530). In this embodiment, the monitoring data includes information relating to applications installed on the computing device 110. Specifically, the monitoring data includes a list of applications installed on the computing device 110 and levels of permission granted to the installed applications. The levels of permission may include permissions granted to access one or more resources of the computing device such as for example access to physical modules and/or storage data. Examples of physical modules include the image capture module (e.g. camera), sensor module, vibrator, speaker, microphone, Bluetooth™ module. Examples of storage data include contacts, calendars, reminders, photos, media player data, etc. Other resources that may be accessed include location data.

Figure 8:
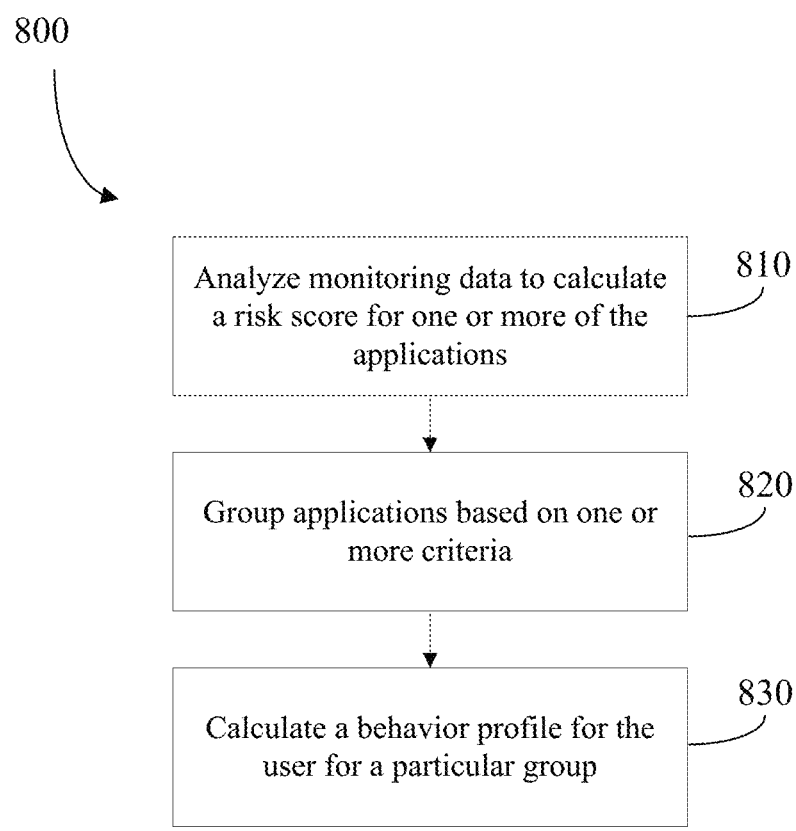
FIG. 8 is a flowchart showing operations performed by a server is generating a behavior profile for a user.

A behavior profile for a user of the computing device 110 is generated based on the monitoring data (step 540). In this embodiment, the behavior profile for the user indicates how risky the user's behavior is considered to be. FIG. 8 is a flowchart showing operations performed by the server 120 to generate the behavior profile for the user according to an embodiment. The operations may be included in a method 800 which may be performed by the server 120. For example, computer-executable instructions stored in memory of the server 120 may, when executed by a processor of the server 120, configure the server 120 to perform the method 800 or a portion thereof.

During method 800, the monitoring data is analyzed to assign a risk score to one or more of the applications (step 810). In this embodiment, the risk score is based on levels of permission granted to the application and knowns risks associated with a particular application.

For example, if an application is granted access to a resource of the computing device 110, the risk rating for the application may be assigned a binary "0" if access to that particular resource is deemed to be safe or not-risky and a binary "1" if access to that particular resource is deemed to be unsafe or risky. Put another way, the risk rating for the application may be deemed to be safe or not-risky if the application does not have access to personal data and may be deemed to be unsafe or risky if the application has access to personal data. For example, if an application is granted access to the vibrator of the computing device 110, this may be deemed to be non-risky and as such the level of permission for the application is assigned a binary "0".

As will be appreciated, an application may be granted access to multiple resources of the computing device 110 and as such the risk rating for the application may be determined by summing the binary result for all of the resources the application has access to. For example, an application may be granted access to the vibrator and the camera of the computing device 110. Access to the vibrator may be deemed to be non-risky and may be assigned a binary "0". Access to the camera may be deemed to be risky and may be assigned a binary "1". The sum of the binary results for the application is calculated as 0+1=1 and as such the risk rating of the application is one (1).

As will be appreciated, a maximum risk rating may be set. For example, the maximum risk rating may be set as five (5). As such, if an application is granted access to five (5) or more resources deemed to be risky, the risk rating of the application is set at the maximum rating of five (5).

Known risks of an application may be obtained by the server 120. For example, if an application is known to be risky (e.g. based on history of the application or if the application is unknown or unrecognized by the server 120), the risk rating of the application may be set at the maximum rating of five (5). Similarly, if an application is known to be safe or not-risky, the risk rating of the application may be set at the minimum rating of zero (0). As will be appreciated, the risk rating of the application may be known by the server and may be set as any number between the minimum risk rating and the maximum risk rating.

It will be appreciated that in another example the risk rating of the applications may be set on a difference scale such as for example between zero (0) and ten (10).

The applications are grouped based on one or more criteria (step 820). In this example, the applications may be grouped based on the type of the application. For example, applications associated with social media may be grouped together as a "Social Media" group. As another example, applications associated with banking or finances may be grouped together as a "Banking" group. In another example, the applications may be groups based on whether or not they are default applications associated with the computing device 110 or applications downloaded by the user. For example, default applications such as an instant messaging application, a photo library, etc. may be grouped as "default" applications. Applications downloaded by the user may include applications downloaded from a mobile application store such as a mobile banking application, a stock trading application, a video streaming application, etc. In another example, all applications may be grouped in a single group.

The risk scores for one or more groups of applications obtained during step 810 are combined to generate a behavior profile for the user for a particular group (830). In this example, the behavior profile for the user is generated by calculating an average risk score. Specifically, the risk score for all applications within a group are summed and the result is divided by the number of applications in the group. For example, five (5) applications may be analyzed and may be assigned respective risk scores of 4, 4, 5, 4 and 3. The sum of the risk scores is 20 and the number of applications analyzed is 5. As such, the behavior profile for the user is determined to be 20/5=4. It will be appreciated that in this example the minimum behavior profile for a user is zero (0) and the maximum behavior profile for a user is five (5).

As will be appreciated, the behavior profile for a user may be calculated in other ways. For example, a behavior profile may be computed by adjusting an initialized score based on each risk rating for the applications.

As will be appreciated, the behavior profile for the user may be calculated using all applications installed on the computing device 110. Put another way, a single group including all applications installed on the computing device 110 may be identified and the behavior profile for the user may be calculated using the risk score for all applications installed on the computing device 110.

Referring back to FIG. 5, the behavior profile is compared to the aspirational profile and when the behavior profile is misaligned with the aspirational profile, a notification is generated and sent, via the communications module, to the computing device 110 (step 550). As mentioned previously, the aspirational profile indicates how risky the user aspires their behavior to be and the behavior profile indicates how risky the user's behavior is considered to be. By comparing the behavior profile to the aspirational profile, it can be determined whether or not the user's actual behavior is aligned with their aspirational behavior. The behavior profile of the user may be considered to be misaligned with the aspirational profile if the difference between the behavior profile and the aspirational profile is greater than a threshold such as for example greater than 1.

As an example, the user's aspirational profile may be determined to be 1.7 indicating that the user aspires their behavior to be safe or low risk. The user's behavior profile may be determined to be 4 indicating that the user's behavior is risky or high risk. The difference between the behavior profile and the aspirational profile is 4−1.7=2.3 which is greater than the threshold of 1 and as such the aspirational profile of the user is considered to by misaligned with the behavior profile of the user.

Figure 9:
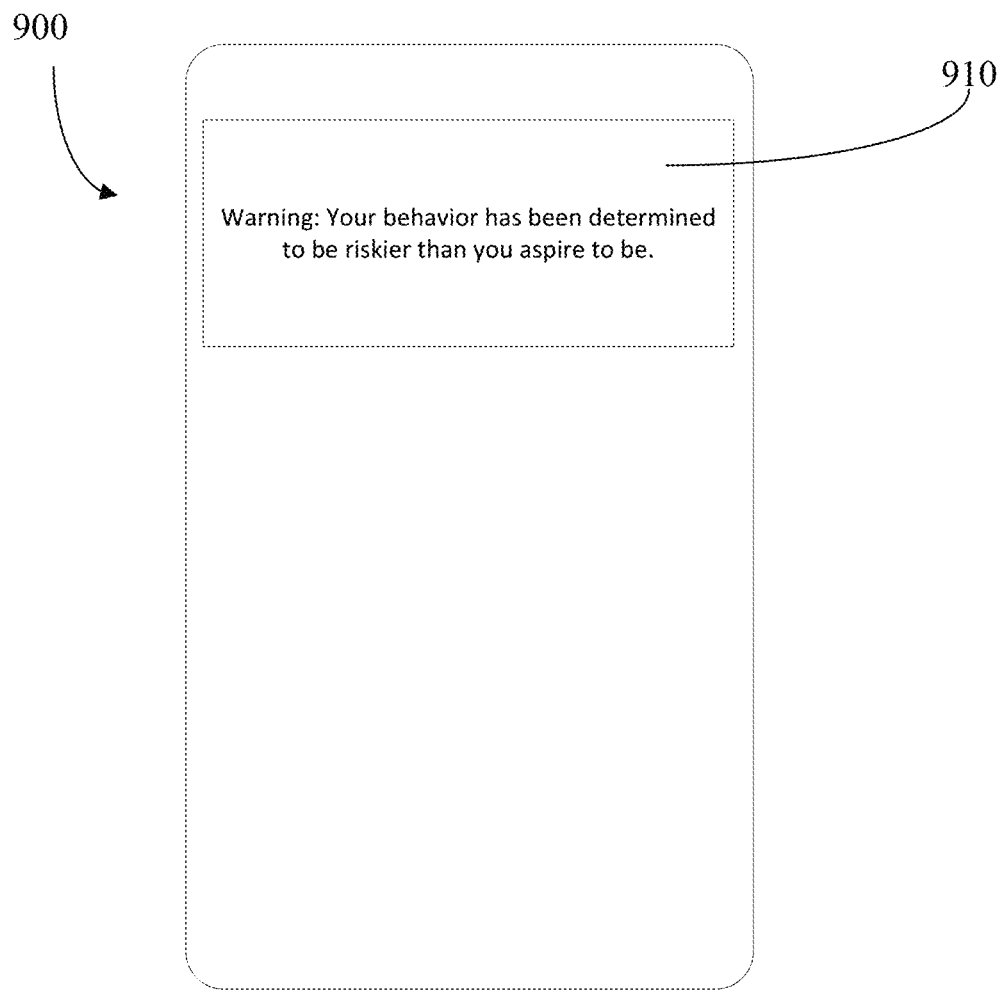
FIG. 9 shows a notification displayed on a computing device.

The notification is generated by the server 120 and sent, via the communications module, to the computing device 110. The notification may be displayed on the computing device 110 indicating to the user that their behavior is misaligned with their aspirational behavior. An example is shown in FIG. 9. As can be seen, notification 900 includes a text box 910 which is displayed on the computing device 110 indicating to the user that their behavior is riskier than they aspire to be.

It will be appreciated that method 500 may be performed periodically such as for example once a day or may be performed every time additional monitoring data is available. In another example, only steps 530 to 550 may be repeated. In another example, the notification may only be sent if the aspirational profile is misaligned with the behavior profile for a threshold amount of time.

Method 500 may be used in open banking to compare a user's aspirational profile with the user's behavior profile. For example, during step 530, monitoring data may be received (step 530) that includes information relating to applications installed on the computing device 110. Specifically, the monitoring data includes a list of applications installed on the computing device 110 and levels of permission granted to the installed applications. The list of applications may include one or more applications related to open banking. The behavior profile of the user may be generated (step 540) using, for example, method 800. During method 800, monitoring data may be analyzed to calculate a risk score for one or more of the applications (step 810). For example, different open banking applications may have access personal data or banking data of the user. An application that only has access to personal contact information may be deemed less risky than another application that has access to the user's bank balance. An application that has access to the user's bank balance may be deemed less risky than another application that has access to the user's transaction history. Application related to open banking may be grouped together (step 820) and a behavior profile for the open banking group may be calculated (step 830). The behavior profile of the user for the open banking group is compared to the aspirational profile for the user and when the behavior profile is misaligned with the aspirational profile, a notification may be sent (step 550).

Figure 10:
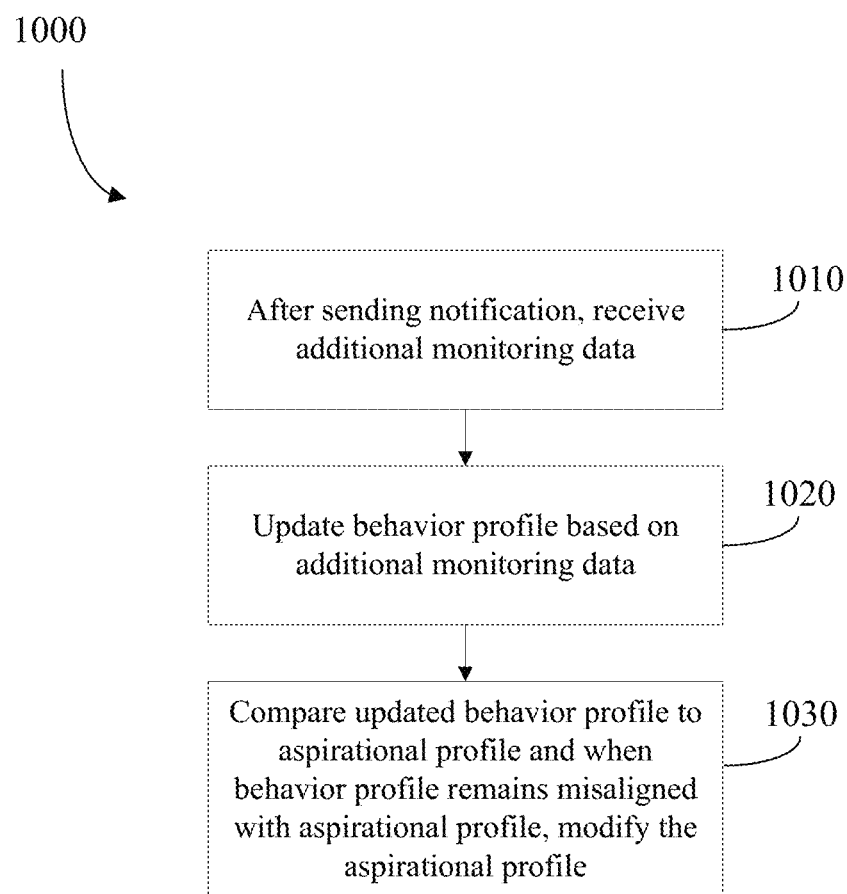
FIG. 10 is a flowchart showing operations performed by a server in modifying an aspirational profile for a user.

After the notification is sent to the computing device 110, the server 120 may continue to receive monitoring data to determine if the user has changed or modified their behavior and may update or modify the aspirational behavior accordingly. FIG. 10 is a flowchart showing operations performed by the server 120. The operations may be included in a method 1000 which may be performed by the server 120. For example, computer-executable instructions stored in memory of the server 120 may, when executed by a processor of the server 120, configure the server 120 to perform the method 1000 or a portion thereof.

After sending the notification during step 550, the server 120 receives, via the communications module and from the monitoring application installed on the computing device 110, additional monitoring data (step 1010). Similar to the monitoring data received during step 530, the additional monitoring data includes information relating to applications installed on the computing device 110.

An updated behavior profile for the user is generated based on the additional monitoring data (step 1020). The updated behavior profile is generated in a manner similar to that of step 540 described above.

The updated behavior profile is compared to the aspirational profile and when the behavior profile remains misaligned with the aspirational profile, the aspirational profile is modified (step 1030). In this embodiment, the updated behavior profile is compared to the aspirational profile in a manner similar to that of step 550 described above. When the behavior profile continues to be misaligned with the aspirational profile, it is assumed that the notification sent during step 550 was not effective. The aspirational profile may then be modified such that the aspirational profile is relaxed or riskier. For example, if the aspirational profile is determined to be 1.7 (during step 520), the aspirational profile may be modified by setting the aspirational profile to the update behavior profile. Alternatively, the aspirational profile may be modified by adding a particular amount to the current aspirational profile. For example, if the aspirational profile is determined to be 1.7 (during step 520), the aspirational profile may be modified by adding a point of 1 to the aspirational profile, thereby setting the aspirational profile to 2.7.

It will be appreciated that method 1000 may be performed periodically such as for example once a day or may be performed every time additional monitoring data is available. In another example, steps 1010 and 1020 may be repeated and the aspirational profile may only be modified if the behavior profile is misaligned with the aspirational profile for a threshold amount of time. By relaxing or modifying the aspirational profile of the user, notification generation may be suppressed or minimized.

Method 1000 may be used in open banking along with method 500 (as described above). For example, after the notification is sent to the user indicating that the behavior profile is misaligned with the aspirational profile (during step 550), the server 120 may receive additional monitoring data (step 1010). The additional monitoring data may be associated with the open banking applications. The behavior profile of the user may be updated based on the additional monitoring data (step 1020). The updated behavior profile may be compared to the aspirational profile and when the behavior profile remains misaligned with the aspirational profile, the aspirational profile may be updated (step 1030). For example, the aspirational profile may be relaxed.

In another example, a prompt may be sent asking the user if they would like to relax the aspirational profile. If the user would like to relax the aspirational profile, the prompt may request that the user enter a new aspirational profile and may include an input field to receive the input from the user. Once the user has entered the new aspirational profile, the aspirational profile may be set to the new value.

Figure 11:
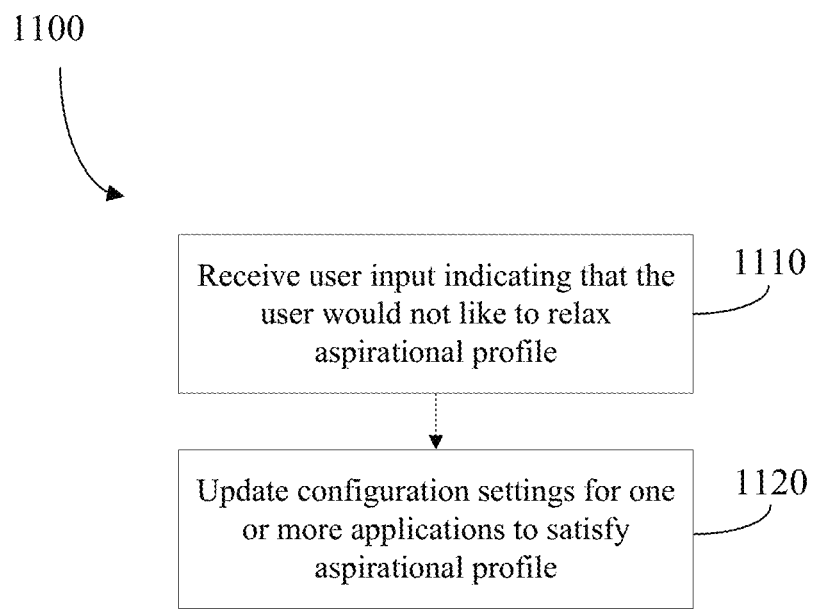
FIG. 11 is a flowchart showing operations performed by a server in updating configuration settings of one or more applications.

If the user would not like to relax the aspirational profile, the server 120 may update configuration settings for one or more applications to update the behavior profile of the user. FIG. 11 is a flowchart showing operations performed by the server 120. The operations may be included in a method 1100 which may be performed by the server 120. For example, computer-executable instructions stored in memory of the server 120 may, when executed by a processor of the server 120, configure the server 120 to perform the method 1100 or a portion thereof.

In response to sending the prompt to the computing device 110, the server 120 receives, via the communications module and from the computing device 110, user input indicating that the user would not like to relax the aspirational profile (step 1110).

The configuration settings for one or more of the applications are updated to satisfy the aspirational profile (step 1120). In this example, a particular application that has a high-risk score (between 3 and 5) may be selected and one or more configuration settings of the particular application may be updated. For example, a configuration setting that allows an application to track location data may be updated such that location data is no longer tracked.

Rather than update configuration settings for the one or more applications, the server 120 may delete one or more of the applications that has a high-risk score (between 3 and 5) to lower the behavior profile of the user. It will be appreciated that the configuration settings may be updated automatically in response to determining that the behavior profile is misaligned with the aspirational profile.

Method 1100 may be used in open banking along with method 500 (as described above). For example, in response to sending the prompt to the computing device 110, the server 120 may receive, via the communications module and from the computing device 110, user input indicating that the user would not like to relax the aspirational profile (step 1110). The configuration settings for one or more of the applications may be updated to satisfy the aspirational profile (step 1120). One or more of the applications within the open banking group may be updated. For example, an application within the open banking group may have a configuration setting allowing the application to have access to the user's transaction history and this configuration setting may be updated to only allow the application to have access to the user's account balance. This may reduce the behavior profile of the user to more closely align with the aspirational profile of the user.

Although in one or more embodiments described above the monitoring data is described as including a list of applications installed on the mobile device and levels of permission granted to the installed applications, in one or more embodiments the monitoring may only include the list of applications. For example, the behavior profile may be generated by analyzing default data sharing configuration options for one or more applications in the list. As another example, the server 120 may access an existing database containing risk scores for a number of popular applications and may obtain, from the database, a risk score for each application listed in the on-device application data.

The behavior profile of the user may be generated using additional or alternative forms or types of monitoring data. For example, the monitoring data may include Internet search history data and/or activity data indicating activity performed on the computing device 110 and the monitoring data may be processed by the server to generate the behavior profile. In this example, if the user has visited riskier or less-secure websites, the behavior profile of the user may be generated as higher risk. As another example, if the user provides personal data on social media posts, the behavior profile of the user may be generated as higher risk.

Although in some embodiments described above, the aspirational profile is described as being generated based on scores, those skilled in the art will appreciate that alternatives are available. In another embodiment the aspirational profile may be generated based on the user responses to the one or more prompts. As an example, a prompt may ask the user "Are you comfortable sharing photos?" and may include a "Yes" and a "No" button. If the user responds with "No", then this answer may be stored as part of the aspirational profile. When the monitoring data indicates that the user has been sharing photos, the notification may indicate to the user "Your aspirational profile says you do not feel comfortable sharing photos, however your behavior indicates that you are sharing photos. Should we change this setting in the aspirational profile?" The notification may include a "Yes" and a "No" button. If the user response with "Yes" then the aspirational profile may be modified to indicate that the user is comfortable sharing photos. As another example, a prompt may ask the user "Are you comfortable sharing banking data?" and may include a "Yes" and a "No" button. If the user responds with "No", then this answer may be stored as part of the aspirational profile. When the monitoring data indicates that the user has downloaded an application that requires access to banking data, the notification may indicate to the user "You have downloaded an application that requires access to your banking data. Are you sure you want to share your banking data?" If the user responds with "Yes" then the aspirational profile may be modified to indicate that the user is comfortable sharing banking data. Alternatively, if the user responds with "Yes" then the monitoring application may override the aspirational profile and allow the application to access banking data. Put another way, a one-time exception may be made to ignore or override the aspirational profile if the user has indicated that they are comfortable sharing data with a particular application.

Although in some embodiments, a risk score is calculated for one or more applications belonging to a particular group, it will be appreciated that applications may be grouped together by the user. For example, within the monitoring application, the user may select which applications to include when generating their behavior profile. The user may also select which applications to ignore or not include when generating their behavior profile. For example, a "Banking Group" may include applications such as a mobile banking application associated with the user's bank and applications associated with third party banking applications that require access to data within the mobile banking application. In this example, the user may choose to ignore the mobile banking application when generating their behavior profile as the mobile banking application may be a trusted application. The behavior profile may be calculated for the third-party banking applications that are not as familiar to the user.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server comprising:
a communications module;
a processor coupled to the communications module; and
a memory coupled to the processor, the memory storing processor-executable instructions which, when executed, configure the processor to:
generate, based on received input, an aspirational profile defining a level of acceptable risk;
generate a behavior profile based on monitoring data that includes a list of applications installed on a remote computing device and levels of permission granted to the installed applications to access one or more types of data; and
when the behavior profile is misaligned with the aspirational profile, modify one of the aspirational profile or the levels of permission granted to one or more of the installed applications.

2. The server of claim 1, wherein prior to modifying the one of the aspirational profile or the levels of permission granted to the one or more of the installed applications, the processor-executable instructions, when executed, further configure the processor to:
send, via the communications module and to the remote computing device, a notification indicating that the behavior profile is misaligned with the aspirational profile.

3. The server of claim 2, wherein the processor-executable instructions, when executed, further configure the processor to:
after sending the notification, receive, via the communications module and from the remote computing device, additional monitoring data;
update the behavior profile based at least on the additional monitoring data; and
when the behavior profile remains misaligned with the aspirational profile, modify the one of the aspirational profile or the levels of permission granted to the one or more of the installed applications.

4. The server of claim 1, wherein generating the behavior profile includes obtaining a score for at least a plurality of the installed applications and generating the behavior profile from the obtained scores.

5. The server of claim 1, wherein generating the behavior profile includes obtaining a score for at least a plurality of the levels of permission granted to the one or more of the installed applications and generating the behavior profile from the obtained scores.

6. The server of claim 1, wherein prior to modifying the one of the aspirational profile or the levels of permission granted to the one or more of the installed applications, the processor-executable instructions, when executed, further configure the processor to:
send, via the communications module and to the remote computing device, a notification that includes a selectable option that, when selected, modifies the aspirational profile based on the monitoring data.

7. The server of claim 1, wherein prior to modifying the one of the aspirational profile or the levels of permission granted to the one or more of the installed application, the processor-executable instructions, when executed, further configure the processor to:
send, via the communications module and to the remote computing device, a notification that includes a selectable option that, when selected, modifies the levels of permission granted to the one or more of the installed applications.

8. The server of claim 7, wherein the selectable option includes a selectable option that, when selected, indicates that the aspirational profile is not to be adjusted.

9. The server of claim 1, wherein the monitoring data includes data indicating behavior conducted on the remote computing device.

10. The server of claim 9, wherein the behavior conducted on the remote computing device includes sharing at least one of personal data, location data, image data and video data.

11. A computer-implemented method comprising:
generating, based on received input, an aspirational profile defining a level of acceptable risk;
generating a behavior profile based on monitoring data that includes a list of applications installed on a remote computing device and levels of permission granted to the installed applications to access one or more types of data; and
when the behavior profile is misaligned with the aspirational profile, modifying one of the aspirational profile or the levels of permission granted to one or more of the installed applications.

12. The computer-implemented method of claim 11, wherein prior to modifying the one of the aspirational profile or the levels of permission granted to the one or more of the installed application, the method further comprises:
sending, to the remote computing device, a notification indicating that the behavior profile is misaligned with the aspirational profile.

13. The computer-implemented method of claim 12, further comprising:
after sending the notification, receiving, from the remote computing device, additional monitoring data;
updating the behavior profile based at least on the additional monitoring data; and
when the behavior profile remains misaligned with the aspirational profile, modifying the one of the aspirational profile or the levels of permission granted to the one or more of the installed applications.

14. The computer-implemented method of claim 11, wherein generating the behavior profile includes obtaining a score for at least a plurality of the installed applications and generating the behavior profile from the obtained scores.

15. The computer-implemented method of claim 11, wherein generating the behavior profile includes obtaining a score for at least a plurality of the levels of permission granted to the one or more of the installed applications and generating the behavior profile from the obtained scores.

16. The computer-implemented method of claim 11, wherein prior to modifying the one of the aspirational profile or the levels of permission granted to the one or more of the installed applications, the method further comprises:
sending, to the remote computing device, a notification that includes a selectable option that, when selected, modifies the aspirational profile based on the monitoring data.

17. The computer-implemented method of claim 11, wherein prior to modifying the one of the aspirational profile or the levels of permission granted to the one or more of the installed applications, the method further comprises:
sending, to the remote computing device, a notification that includes a selectable option that, when selected, modifies the levels of permission granted to one or more of the installed applications.

18. The computer-implemented method of claim 17, wherein the selectable option includes a selectable option that, when selected, indicates that the aspirational profile is not to be adjusted.

19. The computer-implemented method of claim 11, wherein the monitoring data includes data indicating behavior conducted on the remote computing device.

20. A non-transitory computer-readable storage medium storing instructions that, when executed by a processor of a computing system, cause the computing system to:
generate, based on received input, an aspirational profile defining a level of acceptable risk;
generate a behavior profile based on monitoring data that includes a list of applications installed on a remote computing device and levels of permission granted to the installed applications to access one or more types of data; and
when the behavior profile is misaligned with the aspirational profile, modify one of the aspirational profile or levels of permission granted to one or more of the installed applications.

\* \* \* \* \*